United States Patent

Cheng et al.

[11] Patent Number: 5,437,220
[45] Date of Patent: Aug. 1, 1995

[54] BALL BEARING PISTON

[76] Inventors: Chi Cheng; Michael W. Chemg, both of 391 Western Ave., Clarendon Hills, Ill. 60514

[21] Appl. No.: 248,161
[22] Filed: May 24, 1994
[51] Int. Cl.6 .............................. F16J 1/02; F16J 1/04
[52] U.S. Cl. ........................................ 92/178; 92/208; 92/261; 123/193.6; 384/43
[58] Field of Search ....................... 92/178; 123/193.6; 384/43

[56] References Cited

U.S. PATENT DOCUMENTS

| | | | |
|---|---|---|---|
| 2,712,483 | 7/1955 | Ciaccia | 92/178 |
| 3,398,653 | 8/1968 | Foster | 92/178 |
| 4,339,157 | 7/1982 | Olschewski et al. | 384/43 |
| 4,695,170 | 9/1987 | Teramachi | 384/43 |
| 5,152,614 | 10/1992 | Albert et al. | 384/43 |
| 5,346,313 | 9/1994 | Ng | 384/43 |

FOREIGN PATENT DOCUMENTS 1108404  4/1989  Japan ........................... 92/178

Primary Examiner—Thomas E. Denion

[57] ABSTRACT

This invention relates to a piston with its skirt being cut to locate four sets of bearing pads and circulating bearing balls. Each pad has been milled to have a doughnut shaped groove with half of a circle cross-section to hold the ball bearing in circulation during the piston reciprocating motion. Two lines of bearing balls on each side of a piston pin are in contact with the cylinder liner and share the piston thrust load. Lubrication of the ball bearings is ensured by oil slots through the piston skirt under the oil ring groove to the top of the grooves of the bearing pads and to the exposed bearing balls in rolling contact.

8 Claims, 4 Drawing Sheets

FIGURE 1B
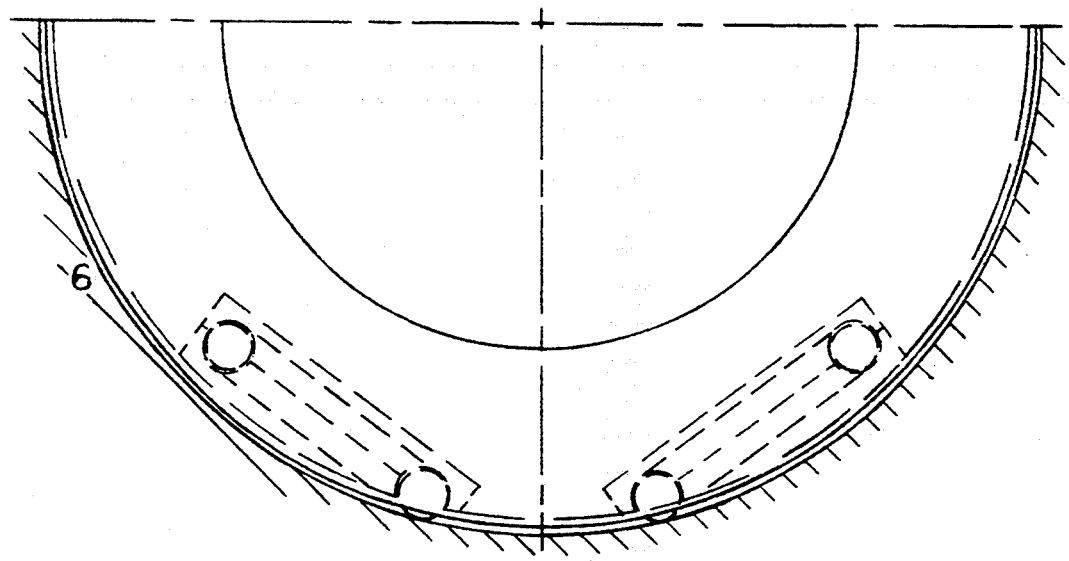
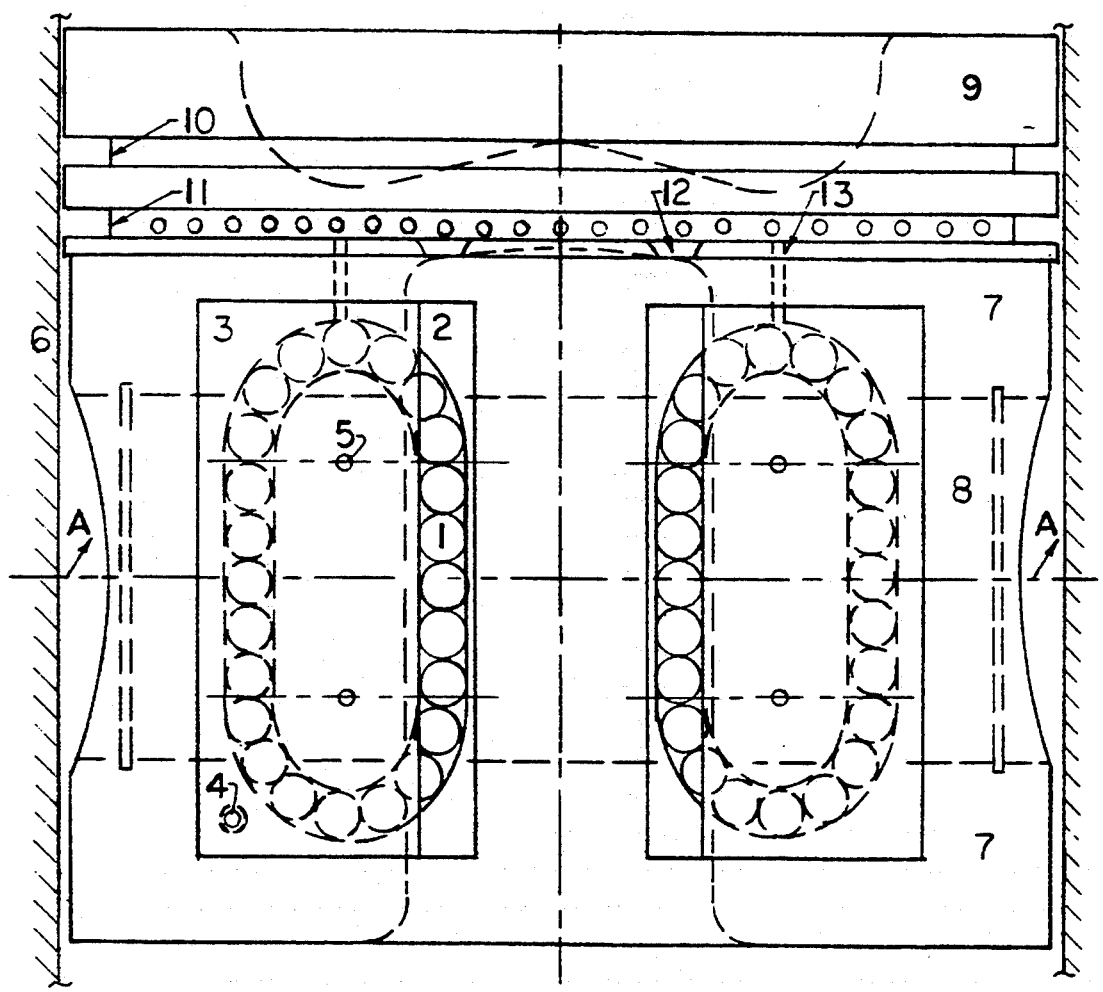
FIGURE 1A

FIGURE 2
FIGURE 3
FIGURE 4
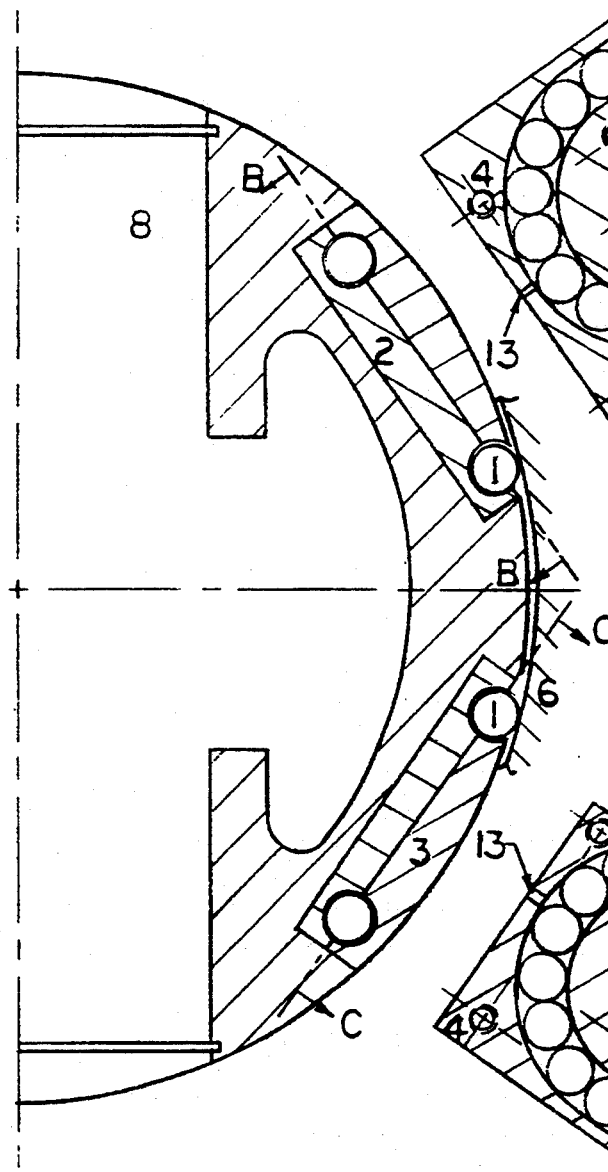
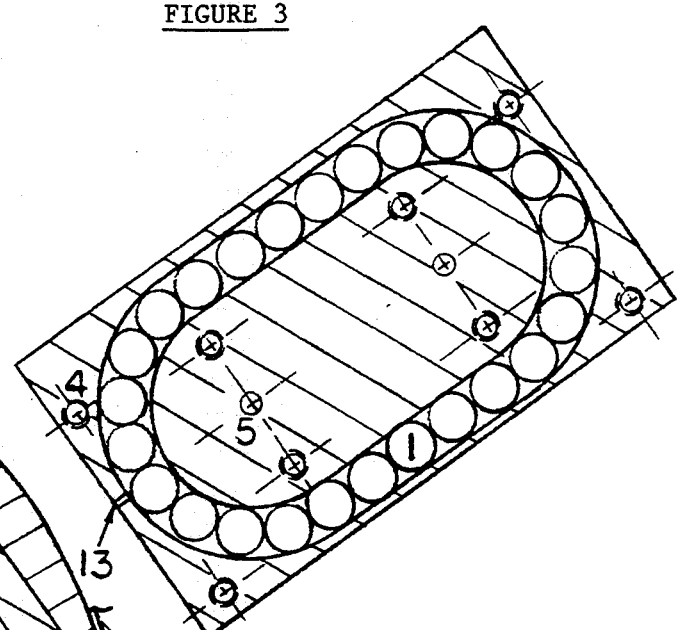
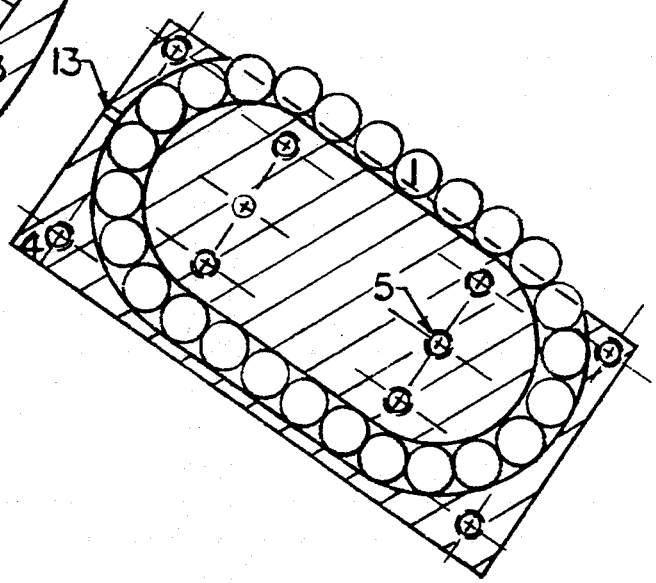

FIGURE 5
FIGURE 6
FIGURE 7
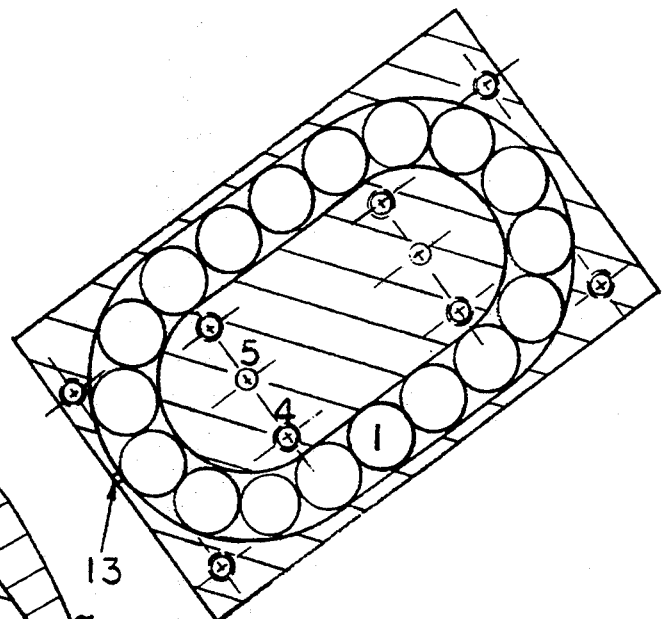
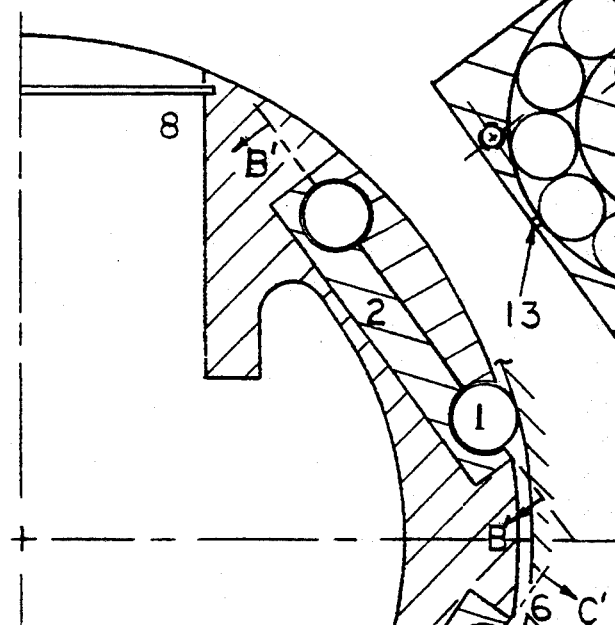
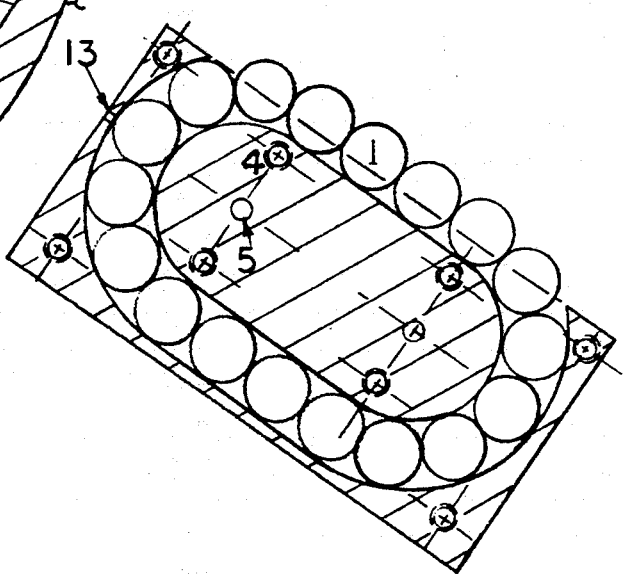

BALL BEARING PISTON

BACKGROUND OF THE INVENTION

The conventional internal combustion engine has a reciprocating piston in a cylinder liner. The piston motion has two dead positions at the top and the bottom (TDC and BDC). The oil film between the piston skirt and the cylinder liner breaks down when the piston reverses its direction of motion at both TDC and BDC. Oil film must be redeveloped and the coefficient of friction in sliding under oil boundary lubrication is high and around 0.1. The frictional power loss of all the pistons in the cylinder liners has accounted for almost 40% to 50% of all the engine's frictional loss. If an engine has a mechanical efficiency of 83%, the frictional loss at the piston will be 6.8% to 8.5% of the engine's available horsepower.

A natural way to reduce the sliding frictional loss due to redeveloping an oil film between the piston skirt and the cylinder liner is to convert the sliding motion of the piston into a rolling motion with less friction. The coefficient of friction for pure rotation in oil is only 0.001 to 0.1 for a ball or roller. Ball bearings should be installed on the piston skirt. Such an idea leads to this invention of an anti-thrust ball bearing piston.

1. Field of the Invention

This invention relates to the field of anti-friction pistons. The reduction of friction has been achieved through a piston with rollers in the skirt, a two piece piston with cylindrical barrel rollers or a spherical ball bearing, and others.

2. Description of the Prior Art

Most of the prior patents utilized the rollers in the piston skirt or in the cylindrical barrel to withstand the piston thrust load under the peak firing pressure of the engine. Some patents use a single big spherical ball bearing. They all convert the sliding motion of a piston into the rotating motion.

U.S. Pat. No. 4,704,949, Piston, to John D. Foster in 1987 uses two sets of three roller bearings mounted on a light weight piston skirt. It has the same advantages of the piston of U.S. Pat. No. 3,398,653 and reduce the required number of roller bearings to three. Each roller has an axle, a roller case and five small rollers within the case and around the axle. It seems that the case hardening of the piston skirt and the cylinder liner may have been considered. But the load carrying capacity of three axles will limit the maximum allowable thrust load of the piston and the engine horsepower.

U.S. Pat. No. 4,704,949, Peristrophic Internal Combustion Engine Assembly and Multi-Part Pistons, to Theodore Koutsoupidis in 1989 uses a two-part piston. The lower bearing piston may have a circumferential ring, cylindrical barrel rollers, or a spherical ball bearing arrangement. Either the rollers or spherical ball bearing will withstand the piston thrust load. Less piston friction due to bearing rotation will be achieved. But the piston becomes multiple parts. Also a single ball bearing has its load carrying capacity and will limit the engine's power rating.

Whatever the precise merits, features and advantages of the above cited references, these pistons are relatively complex and only cover limited applications due to the load carrying capacity of the rollers or ball. When the number of rollers or balls is reduced, the contact stress will be increased if the diameter of the roller and ball remains the same. The contact stress must be less than or equal to the contact strength of the cylinder liner or piston skirt in contact. Otherwise, the engine life will be sacrificed.

SUMMARY OF THE INVENTION

This invention is to convert the sliding motion of a reciprocating piston into a rolling motion of the ball bearing which is built-in the piston skirt. The piston skirt at the thrust and anti-thrust sides has been cut to locate four sets of bearing pads and bearing balls. The pads are composed a base and cover. Both half-pads have a doughnut shaped groove with a circular cross-section to provide a tracking motion of the confined bearing balls. The cover pad is partial and smaller in width such that a full line of bearing balls is protruded out of the cover and the recessed piston skirt. These partially exposed bearing balls are riding and rolling against the cylinder liner wall. The majority of balls are hiding inside the enclosed groove of the pads. The groove length is a little bit longer than the multiple of the number of the balls and the ball diameter. The small clearance between two adjacent balls allow all the balls to roll simultaneously and to circulate within the groove during the reciprocating motion of the piston.

On either the thrust side or the anti-thrust side of the piston skirt, there are two sets of built-in pads and ball bearings. Each pad and ball set has one full line of bearing balls protruded out of the cover pad. The location of these exposed ball lines is by the edge of the slot inside the piston skirt where the connecting rod swings. These two lines of bearing balls from two symmetric pads will roll against the cylinder liner and share the piston thrust load. Each line of bearing balls rolls up and down, and balls retreat into the hidden groove track while new balls come out to share the piston thrust load. Holding the ability to circulate the bearing balls within the groove of the fixed size pads, we prefer to design a larger ball diameter and its associate groove cross-sectional radius. Although the number of balls will be inversely reduced, the total load capacity of ball bearings will be highly increased. This is mainly due to the fact that the loading capacity of the ball is not in proportion to the first power of its diameter but is in proportion to the third power of its diameter.

These protruding bearing balls on one side of the piston skirt are in full contact with the cylinder liner while the other protruding balls have a small clearance to the cylinder liner wall or to the groove wall. The piston will be very straight with little tilting in its reciprocating motion because four lines of bearing balls will guide its motion. Piston rings are not required to share the piston thrust load and are easier to seat themselves in the piston ring grooves for the sealing of the combustion chamber. High ring tension is not necessary and the frictional loss at the ring location will be reduced because the rings are not under the thrust load, and ring tension is reduced. Due to the easiness for the rings to seat and seal, the number of the piston rings may be reduced.

This invention has shown that four base pads are fabricated from steel and have had its material hardened through heat treatment or hard coating. The surface hardness of the groove of the pad must be around RC 60 and be compatible to the hardness of the bearing balls. Base pads may be neglected if the piston skirt is steel or iron based for a large engine of several thousand horsepower. These ball tracking grooves can be milled directly on top of the piston skirt, and only cover pads are needed. Similarly the surface hardness of the cylinder liner in contact to the bearing balls must be increased to around RC 60 such that a B10 life of 10,000 hours can be achieved for the piston, bearing, and cylinder liner.

For the lubrication of these rolling balls, the oil ring groove has four openings aligned over the four exposed ball bearings to distribute oil in the path of travel of the ball bearings. Also there are oil hole paths on top of the pads to supply oil to the groove if it is necessary.

The location of the pads and ball bearing in the height direction is symmetrical to the center line cross-sectional plane of the wrist pin. This distribution will spread the thrust load evenly on the ball bearings in contact.

BRIEF DESCRIPTION OF THE DRAWINGS

FIG. 1 is the front view and half of the symmetric top view of the ball bearing piston.

FIG. 2 is the schematic view of the cross-section A—A on the horizontal plane across the piston pin center-line.

FIG. 3 is the schematic top view of the base pad with a ball circulating groove and ball bearing.

FIG. 4 is the schematic bottom view of the cover pad and ball bearing.

FIG. 5 is the same schematic view of FIG. 2 except that half of the cross-section A—A is shown and larger bearing balls are used in the design.

FIG. 6 is the schematic top view of the base pad with a ball circulating groove and larger ball bearing.

FIG. 7 is the schematic bottom view of the cover pad and ball bearing.

DETAIL DESCRIPTION

Figure 8:
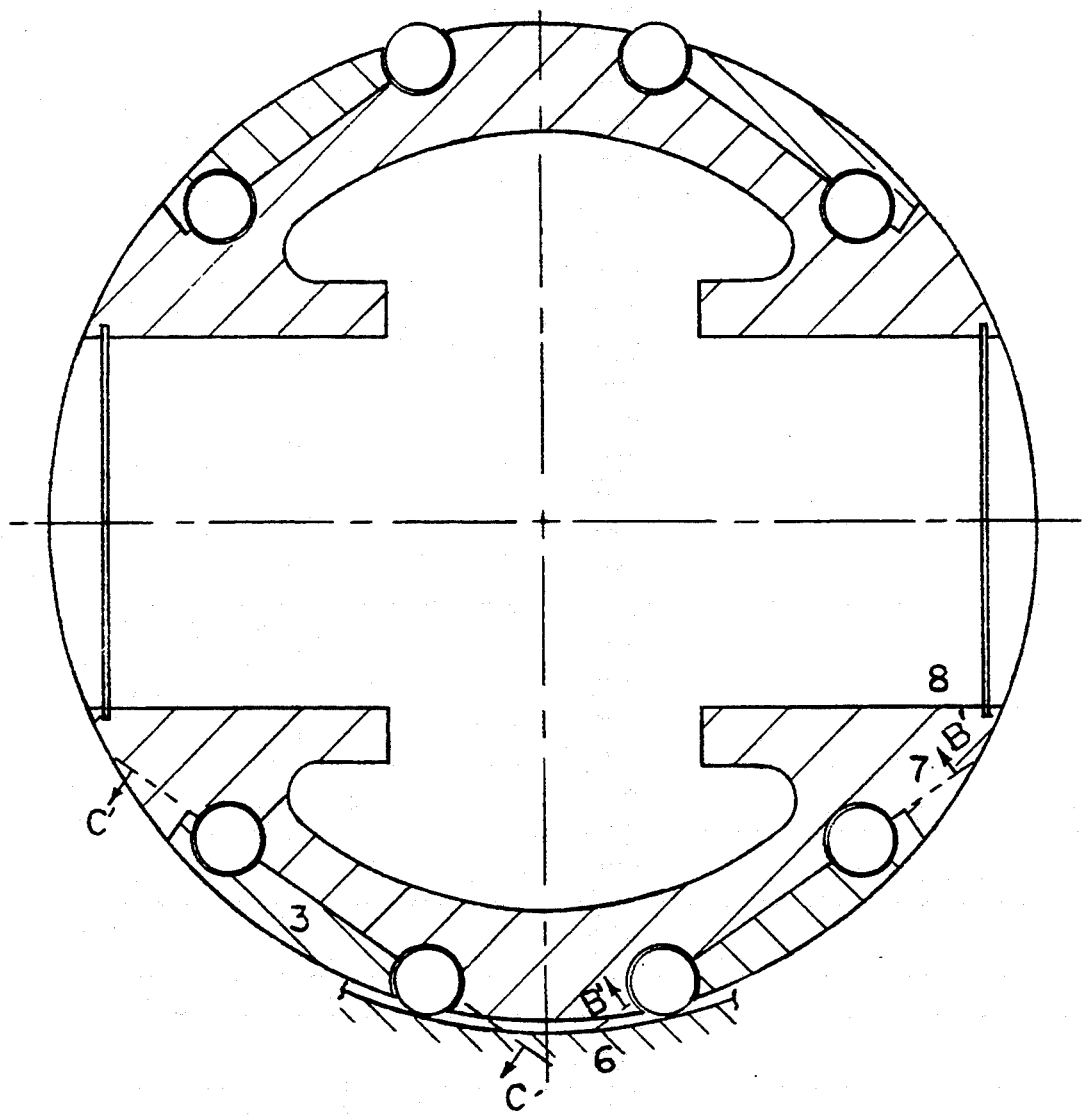
FIG. 8 is the same schematic view of FIG. 5 except that the material of the skirt is steel and the base pad is not needed.

The ball bearing piston in FIG. 1 has a piston head, #9, and a skirt, #7. The piston head may be a flat head, Mexican hat shape bowl, or another bowl shape. In this invention, the Mexican hat bowl shape is shown for convenience. The piston head also has ring grooves which include one to three compression ring grooves, #10, and one oil ring groove, #11. The number of compression rings and ring grooves depends on the engine's firing pressure and power rating. The piston skirt has a cylindrical opening, #8, to hold a piston wrist pin. The skirt diameter is recessed and less than the piston head diameter.

On the piston skirt, four rectangular recessed flat lands have been milled to hold four sets of bearing pads and bearing balls. FIGS. 3 and 4 show the base and the cover pads for smaller bearing balls, and FIGS. 6 and 7 for larger bearing balls respectively. Both base and cover pads have an identical doughnut shaped groove with half of a circle cross-section. The cover pad is partial and smaller in width than the full base pad. Two pin holes are drilled and pins are used for the alignment of the cover and base pads. Both pads in alignment are shown in FIGS. 2 and 5. Eight female screw hole are drilled and threaded on the base and cover pads and the piston skirt. Bearing balls are placed inside the groove before the cover pad is fastened to the base pad and the piston skirt.

Because the cover pad is partial, a full line of bearing balls protrudes out of the cover and is in contact with the cylinder liner wall, #6. FIGS. 2, 5 and 8 show the contact relation between the bearing balls and the cylinder liner. FIG. 1 also shows that four lines of bearing balls guide the piston within the cylinder liner, #6. For lubrication, four slots, #12, are cut on the oil ring groove of the piston head to provide oil to the exposed bearing balls. These slots are aligned over the exposed balls. Additional oil hole slots inside the piston skirt and the top of the pads, #13, will also supply oil to ensure full lubrication of rolling contact.

If the piston skirt is steel in material instead of Aluminum alloy or is able to be hardened, the base pads can be replaced by milling four sets of groove with a half-circle cross-section on the piston skirt directly. These grooves are hardened to RC 60 through heat treatment or coated with a hardened layer. FIG. 8 shows the alternative.

In the extremely large engine, a two piece piston is designed and used. A separate piston skirt can be modified to install the circulating ball bearing for the same rolling contact. A small automotive engine may have six to eight smaller balls in each of four bearing sets. Base pads must be neglected due to space limitation. Grooves with a hard coating will provide the alternative for the bearing ball circulation, Although preferred designs of the invention has been illustrated and described herein, this invention is intended to encompass any rearrangements, modification and substitution of the parts, elements and material as fall within the spirit of the appended claims.

We claim:

1. An anti-friction piston for use in an internal combustion engine or pump for reciprocating motion with a cylinder comprising:

a piston head of circular cross-section with either a bowl disposed therein or a flat head, two to four ring grooves disposed around an outer periphery thereof;

a piston skirt selected from the group consisting of a one-piece integral piston/skirt combination and two-piece articulated piston with a detachable skirt portion;

four sets of bearing pads and four sets of a plurality of ball bearings received in said pads, said pads and bearings being recessed in an outer periphery of said skirt with two sets of said pads and bearings on each side of a wrist pin, said bearing pads including a full width base pad portion and a partial width cover pad portion; and a plurality of locating pins and screws securing each of said pad sets and said bearing sets to said skirt.

2. The piston of claim 1 wherein said skirt has a milled portion to locate said bearing pads, the outside diameter of the piston being flush with said cover pad portion and being smaller than an outer diameter of said piston head.

3. The piston of claim 1 wherein each of said pad sets contains doughnut shaped bearing grooves, said full width base pads having a full bearing groove, and said cover pads having half bearing grooves.

4. The piston of claim 1 wherein a portion of said plurality of ball bearings are disposed in a vertical orientation in contact with said cylinder.

5. The piston of claim 3 wherein sliding motion of the piston causes rolling motion of said bearings, said rolling motion of said bearings recirculates said bearings around said bearing grooves.

6. The piston of claim 1 wherein the bearing pads are located symmetrical to a center line of the wrist pin in a vertical direction such that thrust loads produced by said piston are evenly distributed over two lines of said bearings.

7. The piston of claim 1 wherein two lines of bearings are formed on each of a thrust side and an anti-thrust side of said piston, said two lines alternately resist piston thrust and anti-thrust loading.

8. The piston of claim 1 wherein at least one of said ring grooves has a reduced-tension piston ring disposed therein.

* * * * *